United States Patent
Xiong et al.

(10) Patent No.: US 6,557,400 B2
(45) Date of Patent: May 6, 2003

(54) SURGE BLEED VALVE FAULT DETECTION

(75) Inventors: Yufei Xiong, Phoenix, AZ (US); Dave Faymon, Phoenix, AZ (US); John Rushinsky, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 82 days.

(21) Appl. No.: 09/823,516

(22) Filed: Mar. 30, 2001

(65) Prior Publication Data

US 2002/0139180 A1 Oct. 3, 2002

(51) Int. Cl.⁷ .......................... G01M 15/00; F16K 37/00
(52) U.S. Cl. ........................................ 73/118.1; 701/100
(58) Field of Search ................................ 73/118.1, 168, 73/865.9; 701/100

(56) References Cited

U.S. PATENT DOCUMENTS

| | | | | |
|---|---|---|---|---|
| 2,481,510 A | * | 9/1949 | Hollingsworth et al. | 73/313 X |
| 2,871,671 A | * | 2/1959 | Bartlett, Jr. et al. | 62/172 |
| 3,174,551 A | * | 3/1965 | McCarthy | 416/28 |
| 3,971,208 A | * | 7/1976 | Schwent | 60/773 |
| 4,060,979 A | | 12/1977 | Elsaesser et al. | 60/39.03 |
| 4,061,996 A | * | 12/1977 | Gupta et al. | 340/945 |
| 4,090,065 A | | 5/1978 | Braytenbah et al. | 290/40 R |
| 4,428,194 A | * | 1/1984 | Stokes et al. | 60/779 |
| 4,430,855 A | | 2/1984 | Déneux et al. | 60/39.03 |
| 4,523,286 A | | 6/1985 | Koga et al. | 73/9 X |
| 4,550,380 A | | 10/1985 | Bukowski et al. | 60/645 |
| 4,577,281 A | | 3/1986 | Bukowski et al. | 60/660 |
| 4,662,817 A | * | 5/1987 | Clark et al. | 415/1 |
| 4,756,152 A | * | 7/1988 | Krukoski et al. | 60/773 |
| 4,794,760 A | | 1/1989 | White | 60/39.07 |
| 4,894,782 A | | 1/1990 | Alcock et al. | 73/116 X |
| 4,969,324 A | * | 11/1990 | Woodson | 60/775 |
| 5,222,356 A | | 6/1993 | Evenson et al. | 60/39.02 |
| 5,235,801 A | | 8/1993 | Evenson et al. | 60/39.02 |
| 5,259,188 A | | 11/1993 | Baxter et al. | 60/204 |
| 5,313,778 A | * | 5/1994 | Sweet et al. | 60/772 |
| 5,385,012 A | * | 1/1995 | Rowe | 60/779 |
| 5,402,632 A | | 4/1995 | Nobre et al. | 60/39.02 |
| 5,709,526 A | | 1/1998 | McLeister et al. | 415/1 |
| 5,730,504 A | * | 3/1998 | Gaughen | 303/3 |
| 5,750,881 A | * | 5/1998 | Dorenkott et al. | 73/37 |
| 5,752,379 A | | 5/1998 | Schafer et al. | 60/39.24 |

OTHER PUBLICATIONS

TDB–Acc–No.: NN76122556 "Dynamic Monitoring System for Microprocessor Engines" *IBM Technical Disclosure Bulletin*, vol. 19, No. 7, pp. 2556–2557, Dec. 1976.*

* cited by examiner

*Primary Examiner*—Thomas P. Noland
(74) *Attorney, Agent, or Firm*—Robert Desmond, Esq.

(57) ABSTRACT

Improved methods and systems are provided for detecting surge bleed valve faults and analyzing the performance of surge bleed valves in gas turbines. The method includes monitoring the rates of rotation of an engine fan and an engine gas generator in a gas turbine engine. While so doing, a valve status change signal is transmitted to a surge bleed valve in the gas turbine engine. The difference between the two monitored rates of rotation is determined. A surge bleed valve fault signal is generated if the difference between the two monitored rates of rotation does not change by at least a predetermined amount immediately following transmission of the valve status change signal to the surge bleed valve.

15 Claims, 5 Drawing Sheets

SURGE BLEED VALVE FAULT DETECTION

BACKGROUND OF THE INVENTION

This invention relates to monitoring gas turbine engines and, more particularly, to the monitoring and the operation of a surge bleed valve in a gas turbine engine and detecting a fault in the operation of such surge bleed valve.

Gas turbine engines, such as those used on jet engine powered aircraft, employ surge bleed valves for preventing compressor surge by bleeding or by-passing some of the airflow around one of the compressors. Unfortunately, such surge bleed valves sometimes fail to operate properly. For example, a surge bleed valve may stay open and fail to close after being instructed to close. This reduces the operating efficiency of the gas turbine engine.

A previously proposed method for detecting the failure of a surge bleed valve to open or close is to attach a position sensing switch to the surge bleed valve for providing a signal as to whether the valve is open or closed. There are, however, disadvantages to this approach. For one thing, the position sensing switch itself may malfunction and give a false indication of the surge bleed valve condition. Furthermore, the use of a position sensing switch complicates the construction of the surge bleed valve and increases its manufacturing cost.

As may be seen from the foregoing discussion, there is a need for a method of surge bleed valve fault detection which does not require the use of a position sensing switch.

SUMMARY OF THE INVENTION

In one aspect of the present invention, a method of detecting surge bleed valve faults in a gas turbine engine comprises monitoring an engine operating parameter in the gas turbine engine; transmitting a valve status change signal to a surge bleed valve in the gas turbine engine; and setting a valve operation check signal to a fault indicating state if the monitored engine operating parameter does not change by at least a predetermined amount immediately following transmission of the valve status change signal to the surge bleed valve.

These and other features, aspects and advantages of the present invention will become better understood with reference to the following drawings, description and claims.

DETAILED DESCRIPTION OF THE INVENTION

Figure 1:
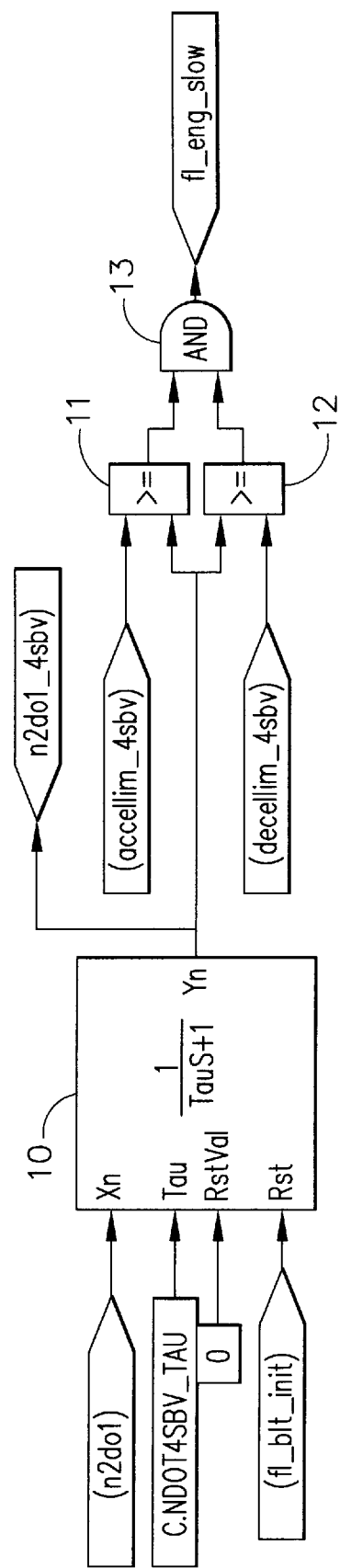
FIG. 1 is a schematic diagram showing representative logic for producing an engine slow signal used in accordance with the present invention.

A gas turbine engine is usually equipped with one or more surge bleed valves to optimize the performance of the engine. The functionality of a surge bleed valve is sometimes monitored by means of a hardware position sensing switch mounted on the surge bleed valve. In other cases, such functionality is simply not monitored. The present invention provides the desired monitoring without the use of hardware switches by monitoring engine operating parameters which are affected by the opening and closing of the surge bleed valves.

When a surge bleed valve closes, the effects on the operation of a typical two-spool jet engine are:
 (1) there is a sudden increase in the rotary speed of the engine fan or low pressure compressor: and
 (2) there is a sudden decrease in the rotary speed of the engine gas generator or high pressure compressor.

When a surge bleed valve opens, the effects on the operation of a typical two-spool jet engine are just the opposite, namely:
 (1) there is a sudden decrease in the rotary speed of the engine fan or low pressure compressor; and
 (2) there is a sudden increase in the rotary speed of the engine gas generator or high pressure compressor.

Based on the foregoing analysis, the engine operating parameters of fan speed and gas generator speed can be used to monitor the operation of surge bleed valves. The opening or closing of a surge bleed valve will cause a large spike in a variance value calculated from these engine operating parameters. In order to distinguish the difference between normal engine acceleration or deceleration and surge bleed valve opening or closing, and to prevent false indications, the results of the monitoring procedure will be recognized as valid only if the gas turbine engine is in steady state, slow acceleration, or slow deceleration operation and the status command to the surge bleed valve stays true (e.g., close) or false (e.g., open) for at least a predetermined time interval (e.g., one second) before the command changes.

For purposes of illustration, the invention will be explained for the case of a turbofan jet engine. A suitable example is the AS900 turbofan engine manufactured by Honeywell International, Inc.

The surge bleed valve performance analysis procedure described herein makes use of two engine operating characteristics and three command signals as inputs to a novel surge bleed valve fault detection logic. The two engine operating signals are a fan speed signal (n1) derived from a suitable fan speed transducer or sensor and a gas generator speed signal (n2) derived from a suitable gas generator speed transducer or sensor. The three command signals are a set point signal for calculating a derivative of gas generator speed, a command signal for controlling the open or closed status of the surge bleed valve, and a flag signal to indicate that the engine is lit and running.

In an illustrative example, it is assumed that the surge bleed valve is a solenoid operated valve which is spring loaded to the open condition. The valve is closed by electrically energizing the solenoid. In this case, the valve should be closed when the valve command signal is true (solenoid energized) and should be open when the valve command signal is false (solenoid not energized). The valve status should change from open to closed when the command signal changes from false to true and, conversely, should change from closed to open when the command signal changes from true to false.

The testing of the status of the surge bleed valve will be considered to be a valid test only when the following two conditions are met:
 (1) the gas turbine engine is in a steady state, slow acceleration, or slow deceleration operating condition (herein defined as an "engine slow" condition); and (2) the valve command signal stays true or false for at least a predetermined time interval (e.g., one second) before it changes status. When the surge bleed valve is commanded to change its status and condition (2) is met, a timer is started such as a 400 millisecond timer. When the surge bleed valve is commanded to close and, if within the 400 milliseconds of this example, condition (1) is met and the variance calculated is greater than or equal to a predetermined threshold, a proper closure flag signal (fl_sbvacls) is set to true to indicate that the surge bleed valve has closed properly. When the surge bleed valve is commanded to open and, if within the 400 milliseconds, condition (1) is met and the variance calculated is greater than or equal to a predetermined threshold, a proper opening flag signal (fl_sbvaopn) is set to true to indicate that the surge bleed valve has opened properly.

When the 400 millisecond timer expires and if condition (1) is met, the following items are updated:

(a) a "condition proper" counter is incremented to indicate how many times the condition has been proper for a valid surge bleed valve fault detection;

(b) if either of the proper closure or proper opening flags is true, a current valve okay flag is set to true to indicate that the surge bleed valve currently does not have a fault and a "number of okay counts" counter is incremented to indicate how many times proper surge bleed valve movement has been detected; and (c) if both the proper closure flag and the proper opening flag are false, the current valve okay flag is set to false to indicate that the surge bleed valve is currently faulted.

Referring to FIG. 1, there is shown a representative embodiment of logic for producing the "engine slow" signal (fl_eng_slow) which, when true, indicates that condition (1) set forth above is met. (Note: "fl" denotes "flag".) If the engine slow signal is true, the engine is operating in a steady state, slow acceleration, or slow deceleration manner and, thus, is not experiencing any rapid acceleration or rapid deceleration. The engine operating parameter supplied to the FIG. 1 logic is a signal n2dot which represents the derivative of the gas generator speed signal n2. This n2dot signal is fed to a first-order filtered derivative calculation unit 10 which generates a filtered derivative output signal n2dot_4sbv. The relationship between the filter unit output and input signals is defined by the Laplace transform expression $1/(\text{Tau}S+1)$, where Tau is a time constant and S is a complex operator. The time constant Tau of filter unit 10 is set by a constant value C.NDOT4SBV_TAU. In practice, this time constant value may range from about 0.025 to 0.4 seconds, with a default value of 0.1 seconds.

The output of filter unit 10 is supplied to the lower input of a comparator 11 and the upper input of a comparator 12. A variable accellim_4sbv is supplied to the upper input of comparator 11 and sets the acceleration limit for the "engine slow" signal. In practice, this acceleration limit may range from about 1.0 to 10.0 percent per second. A variable decellim$_n$_4sbv is supplied to the lower input of comparator 12 and sets the deceleration limit for the "engine slow" signal. In practice, this deceleration limit may range from about minus 1.0 to minus 10.0 percent per second.

The outputs of comparator 11 and comparator 12 are supplied to the two inputs of an AND logic element 13. The output of AND logic 13 will be true when the outputs of both of comparators 11 and 12 are true. This true signal at the output of AND logic 13 constitutes the "engine slow" signal. It occurs when the output of filter unit 10 is less than or equal to the acceptable acceleration limit and is greater than or equal to the acceptable deceleration limit. This "engine slow" signal indicates that the gas turbine engine is not experiencing either rapid acceleration or rapid deceleration.

Figure 2:
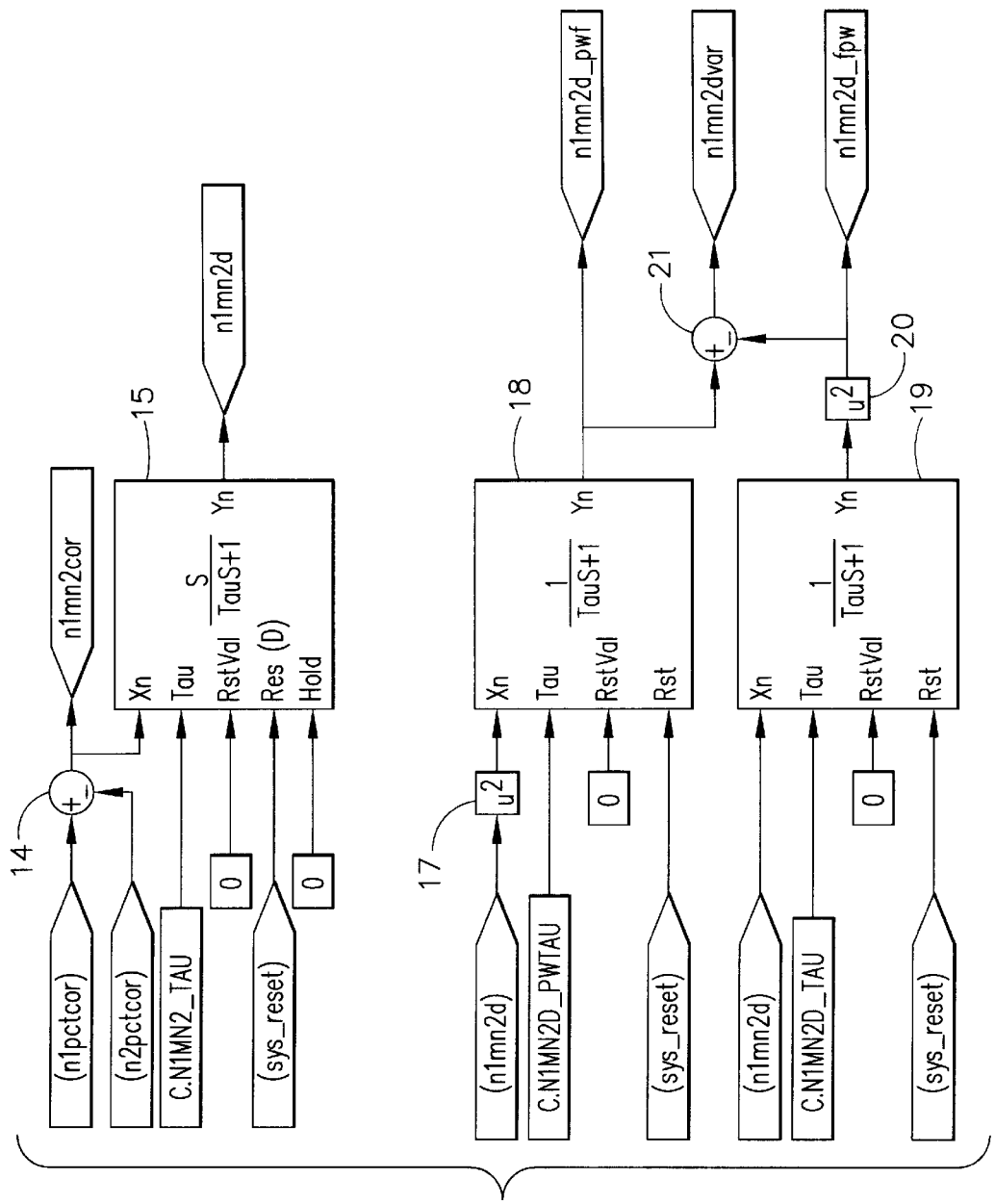
FIG. 2 is a schematic diagram showing representative logic for producing a variance signal used in accordance with the present invention.

Referring to FIG. 2, there is shown a representative embodiment of logic for producing a variance signal that may be used in the present invention. The primary inputs to the FIG. 2 logic are a pair of signals n1pctcor and n2pctcor which are derived from a pair of engine operating parameters. The input signal n1pctcor is a corrected version of the n1 speed signal produced by the engine fan speed transducer, expressed as a percentage of maximum speed. The other input signal n2pctcor is a corrected version of the n2 speed signal produced by the engine gas generator speed transducer, expressed as a percentage of maximum speed. These two input signals are supplied to a subtractor 14 to produce a difference signal n1mn2cor (n1 minus n2 corrected). This difference signal is supplied to a first-order filtered derivative calculation unit 15 which produces a filtered derivative signal n1mn2d corresponding to the first derivative with respect to time of the input difference signal n1mn2cor. The time constant Tau of derivative calculation unit 15 is set by a constant value C.N1MN2_TAU which is supplied to the Tau control input of unit 15. In practice, this Tau constant may range from about 0.025 to 0.4 seconds, with a default to 0.1 seconds. The reset value input RstVal of unit 15 is provided with a reset value of zero. At reset time, the Res(D) input of unit 15 is supplied with a system reset signal sys_reset which resets unit 15 to this reset value of zero. This occurs when the fault detection logic is powered up. The Hold control input of unit 15, when fed with a true input signal (a value of one), causes unit 15 to hold constant the output signal of unit 15.

The derivative signal n1mn2d output by unit 15 is supplied by way of a power amplifier 17 to the signal input of a further first-order filtered derivative calculation unit 18 to produce a second derivative output signal n1mn2d_pwf. The time constant Tau of the derivative calculator 18 is set to a constant value of C.N1MN2D_PWTAU, which may range from about 0.025 to 0.4 seconds, with a default to 0.1 seconds.

The derivative signal n1mn2d from unit 15 is also fed to another first-order filtered derivative calculator 19 having a time constant set by a constant value C.N1MN2D_TAU (such as a default to 0.1 seconds, and a range from about 0.025 to 0.4 seconds). The output of derivative calculator 19 is fed to a power amplifier 20 to generate a second derivative output signal n1mn2d_fpw.

The output from power amplifier 20 is subtracted from the output from derivative calculator 18 by a subtractor 21 to produce the desired variance signal, designated as n1mn2dvar. This variance signal n1mn2dvar is used to determine whether the surge bleed valve has closed or opened properly.

Figure 3:
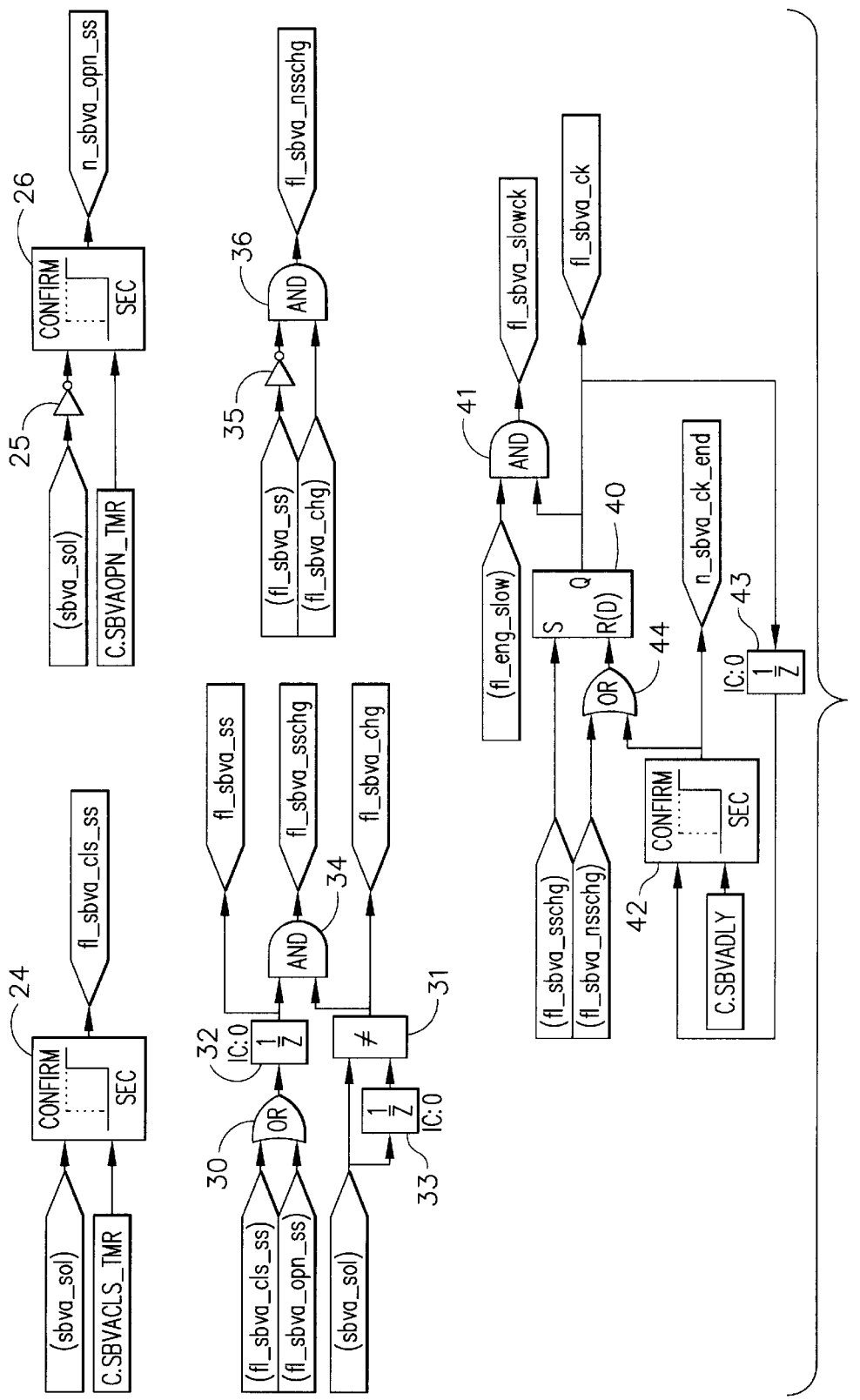
FIG. 3 is a schematic diagram showing representative timing functions which may be used in accordance with the present invention.

Referring to FIG. 3, there is shown representative logic for various timing functions that may be used in the present description. The surge bleed valve command or control signal is designated as sbva_sol. A true level for this signal indicates that the surge bleed valve has been commanded to close. A false level indicates that it has been commanded to open. A close valve command timer 24 is started when the sbva_sol valve command signal is set to true. The timing interval for timer 24 is set to C.SBVACLS_TMR seconds (such as a range from about 0.1 to 5.0 seconds, with a default to 0.4 seconds). If the sbva_sol command signal is still true after the predetermined C.SBVACLS_TMR time interval, the output signal fl_sbva_cls_ss of close valve command timer 24 is set to true. (Note: "ss" denotes "steady state".) This indicates that the valve close command signal is in a desired steady state condition.

The valve command signal sbva_sol is also supplied by way of a signal inverter circuit 25 to an open valve command timer 26. When the sbva_sol valve command signal is set to false (valve open command), the input of timer 26 goes true and timer 26 is started. The timing interval for timer 26 is set at a predetermined C.SBVAOPN_TMR seconds (such as a range from 0.1 to 5.0 seconds, with a default to 0.4 seconds). If the sbva_sol command signal is still false after the predetermined C.SBVAOPN_TMR time interval, the output signal fl_sbva_opn_ss of open valve command timer 26 is set to true. This indicates that the valve open command signal is in a desired steady state condition.

The steady state valve close command and the steady state valve open command signals from timers 24 and 26 are supplied to an OR logic circuit 30. The valve command signal sbva_sol is supplied to the upper input of a comparator 31. Elements 32 and 33 are one control period signal delay elements for their input signals, with "IC:0" indicating that the initial condition for delay elements 32 and 33 is zero. The delay provided by elements 32 and 33 may be, for example, 20 milliseconds. OR circuit 30 and delay element 32 produce an output signal fl_sbva_ss which, when true, indicates that the valve command signal (either close or open) is in a desired steady state condition.

Comparator 31 produces an output signal fl_sbva_chg which is true when its two input signals are not equal. Otherwise, the output of comparator 31 is set to false. The not equal condition occurs when the valve command signal sbva_sol changes from true to false or vice versa. Thus, the output signal fl_sbva_chg from comparator 31 is set to true for a time period corresponding to the delay of delay element 33 each time the valve command signal changes from open to close or vice versa.

The steady state signal from delay element 32 and the actual change signal from comparator 31 are supplied to the two inputs of an AND logic circuit 34 to produce a steady state valve command change signal fl_sbva_sschg at the output of AND circuit 34. The output of AND 34 is true only if both inputs are true. A true level output from AND 34 indicates that the surge bleed valve has been commanded to change from a desired steady state condition. Hence, the valve status change is acceptable for analysis purposes.

The steady state signal from delay element 32 is also supplied by way of a signal inverter circuit 35 to a further AND circuit 36. The valve command change signal from comparator 31 is also supplied to the second input of AND circuit 36. Because of the inverting action of inverter 35, the upper input of AND 36 is true when neither of the valve command signals has passed its steady state test. Thus, the output signal fl_sbva_nsschg from AND circuit 36 is set to true to indicate that the valve change command is not made from a steady state condition and, hence, is not acceptable for analysis purposes.

The steady state valve change signal fl_sbva_sschg from AND circuit 34 is supplied to the set input S of a latch circuit 40. When the S input of latch 40 is true and a reset input R(D) is false, latch 40 sets its output Q to true. When the reset input R(D) is true, the output Q is set to false regardless of the status of the S input. When the steady state change signal fl_sbva_sschg is true, the latch 40 output signal fl_sbva_ck will be set to true. This indicates that a valve check process has started. When both the engine slow signal fl_eng_slow from the FIG. 1 logic and the fl_sbva_ck valve check signal from latch 40 are true, an AND circuit 41 will produce an output signal fl_sbva_slowck. When true, this signal indicates that the gas turbine engine is not experiencing rapid acceleration or deceleration and that a valve check process has started.

A timer 42 is started when its upper input is set to true. This occurs when latch 40 sets the valve check signal fl_sbva_ck to true, such signal being supplied by way of a signal delay element 43 to the upper input of timer 42. If its upper input is true for more than C.SBVADLY seconds (such as a range from about 0.1 to 1.0 seconds, with a default to 0.38 seconds), timer 42 will set its output (fl_sbva_ck_end) to true. When either this output signal or the not steady state change signal fl_sbva_nsschg from AND circuit 36 is true, the output of OR circuit 44 will reset latch 40 to the "no check" (output false) condition.

Figure 4:
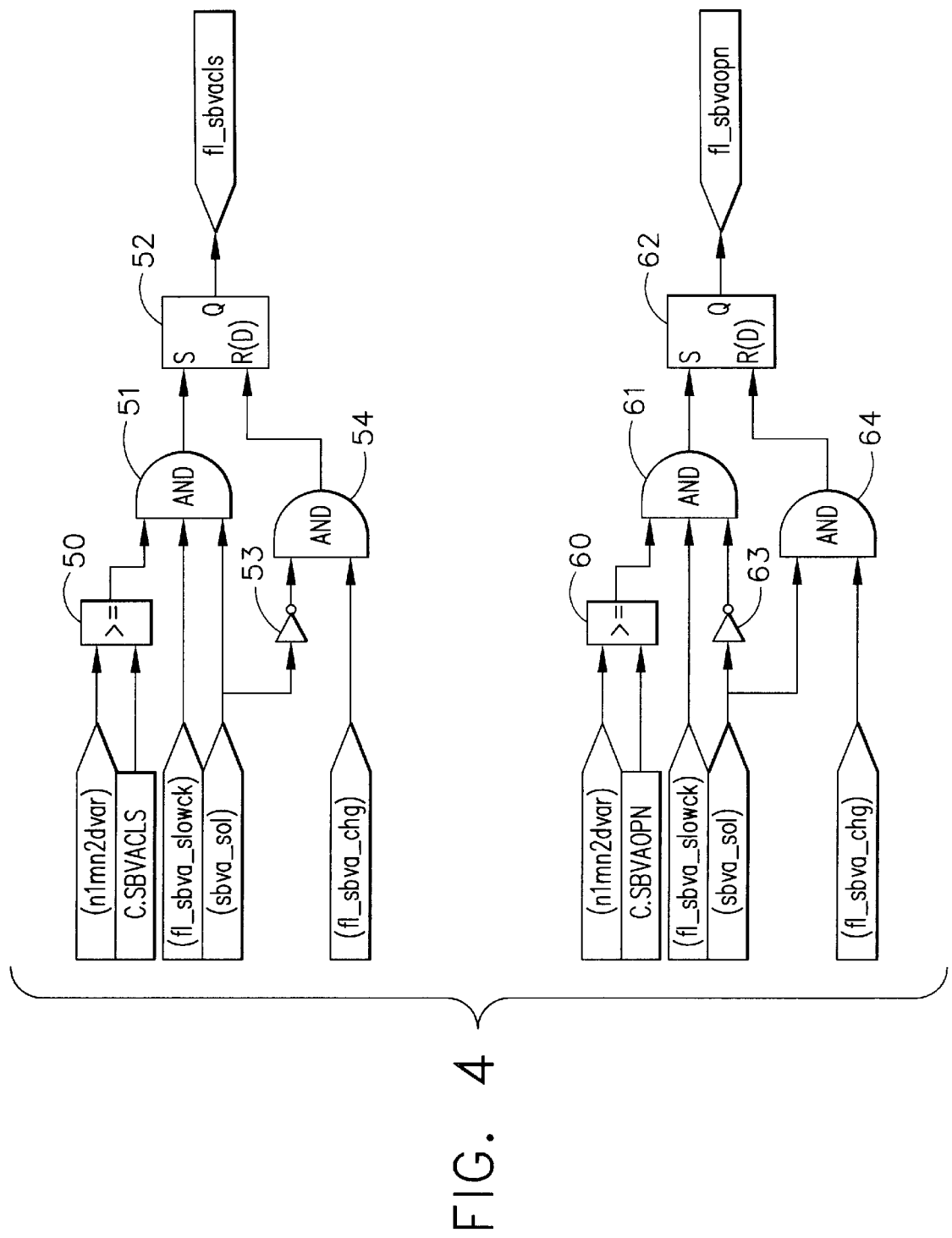
FIG. 4 is a schematic diagram showing representative logic for producing valve open and valve closed indicator flags which may be used in accordance with the present invention.

Referring now to FIG. 4, there is shown a representative embodiment of logic for producing proper valve open and proper valve closed signals that may be used in the present invention. The variance signal n1mn2dvar from the logic shown in FIG. 2 is supplied to the upper input of a comparator 50. If this variance signal is greater than or equal to a predetermined close threshold C.SBVACLS, the output of comparator 50 is placed in a true condition. In practice, this close threshold C.SBVACLS is set at a fixed value that may be in a range from about 0.05 to 0.4, with a default to 0.15.

If all the inputs to an AND circuit 51 are true, then a proper valve closure indicating latch 52 is set to a true state. This occurs if the variance signal is equal to or greater than the close threshold, the slow check signal fl_sbva_slowck from FIG. 3 is true, and the valve command signal sbva_sol is true (true=close). In his case, the output Q of latch 52 is at a true level, making the latch output signal fl_sbvacls true. This indicates that a proper surge bleed valve closure has been detected.

Latch 52 and, hence, its output signal fl_sbvacls will be reset to false via signal inverter circuit 53 and AND circuit 54 every time the surge bleed valve is commanded to open (sbva_sol=false). The output of AND circuit 54 will be true for only one control cycle.

The variance signal n1mn2dvar from the logic shown in FIG. 2 is also supplied to the upper input of a comparator 60. If this variance signal is greater than or equal to a predetermined open threshold C.SBVAOPN, the output of comparator 60 is placed in a true condition. In practice, this open threshold C.SBVAOPN is set at a fixed value in a range from about 0.05 to 0.4, with a default to 0.15.

If all the inputs to an AND circuit 61 are true, then a proper valve open indicating latch 62 is set to a true state. This occurs if the variance signal is equal to or greater than the open threshold, the slow check signal fl_sbva_slowck from FIG. 3 is true and the valve command signal sbva_sol is false (false=open). Signal inverter circuit 63 converts this false sbva_sol value to true. In this case, the output Q of latch 62 is at a true level, making the latch output signal fl_sbvaopn true. This indicates that a proper surge bleed valve opening has been detected.

Latch 62 and, hence, its output signal fl_sbvaopn will be reset to false via AND circuit 64 every time the surge bleed valve is commanded to close (sbva_sol=true). The output of AND circuit 64 will be true for only one control cycle.

Figure 5:
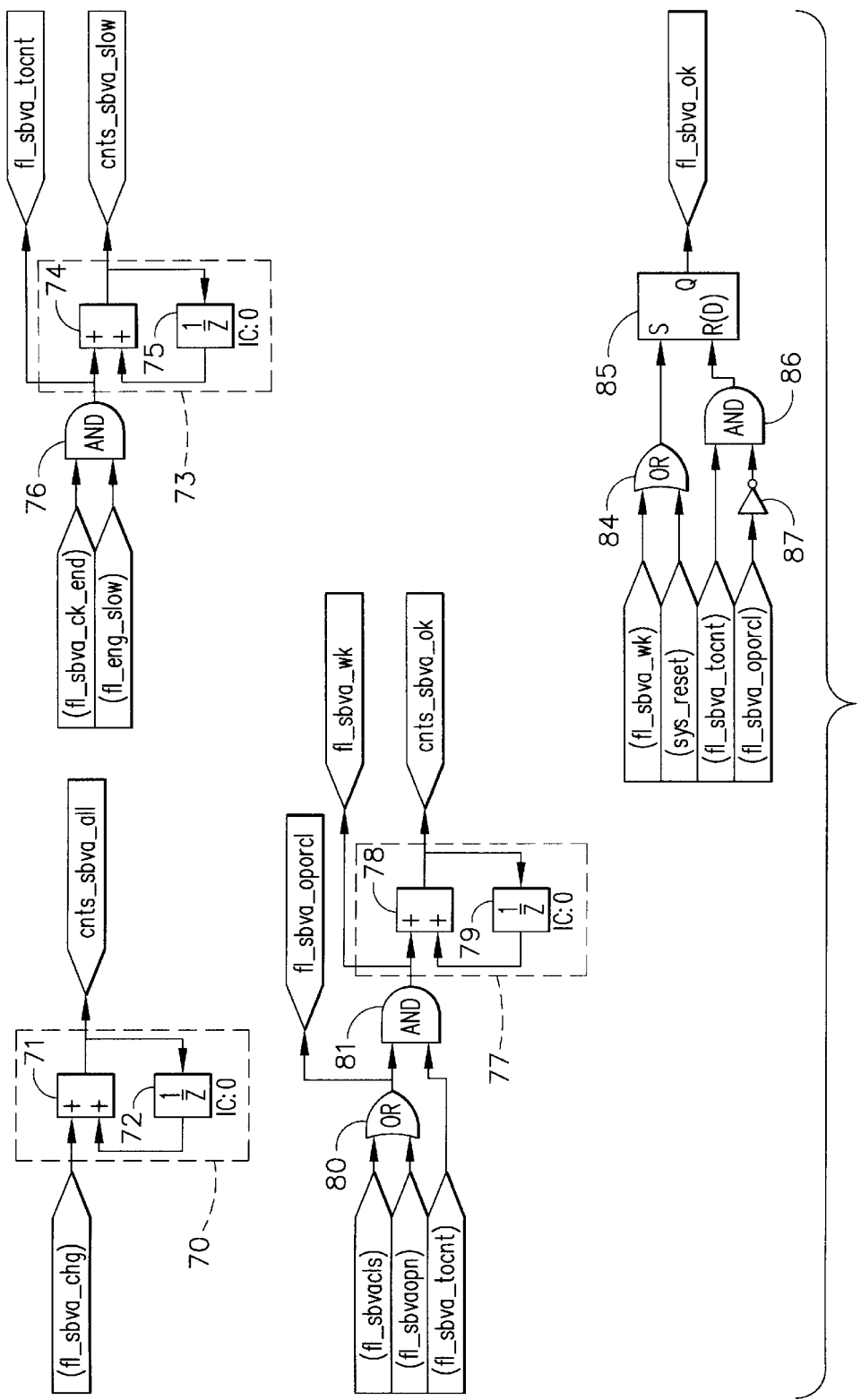
FIG. 5 is a schematic diagram showing representative counters which may be used to evaluate the performance of a surge bleed valve in accordance with the present invention.

Referring now to FIG. 5, there are shown representative counters which may be used to count various ones of the above-described signals, such counts being useful for evaluating the performance of the surge bleed valves in the gas turbine engine. A first such counter 70 is comprised of an adder circuit 71 and a one control period signal delay element 72. Every time the surge bleed valve command sbva_sol changes from true to false or vice versa, the fl_sbva_chg signal from FIG. 3 goes true for a brief interval. This true pulse increments counter 70 by one count. As a result, the count value cnts_sbva_all output by counter 70 indicates how many times the surge bleed valve has been commanded to change its status.

A second counter 73 is comprised of an adder circuit 74 and a one control period signal delay element 75. Every time both the fl_sbva_ck_end signal from FIG. 3 is true and the fl_eng_slow engine slow signal from FIG. 1 is true, AND circuit 76 operates to increment counter 73 by one count. As a result, the count value cnts_sbva_slow output by counter 73 indicates how many times conditions have been proper for a reliable surge bleed valve fault detection.

A third counter 77 is comprised of an adder circuit 78 and a one control period signal delay element 79. Whenever either the proper closure detection signal fl_sbvacls from FIG. 4 or the proper opening detection signal fl_sbvaopn from FIG. 4 is true, an OR circuit 80 will enable a first input of an AND circuit 81.

When the count signal fl_sbva_tocnt is supplied to the second counter 73, it is also supplied to the second input of AND circuit 81 to enable this second input. When both of the AND circuit 81 inputs are enabled (true), AND circuit 81 operates to increment counter 77 by one count. As a result, the count value cnts_sbva_ok output by counter 77 will indicate how many times a proper opening or closing of the surge bleed valve has been detected.

When the fl_sbva_wk signal at the output of AND circuit 81 increments counter 77, such signal is also supplied by way of an OR circuit 84 to set a current status indicating latch 85 to a true state (latch output Q true) to indicate that the surge bleed valve does not currently have a fault. Current status latch 85 is reset to a false state by an AND circuit 86 when the counter 73 is incremented by the fl_sbva_tocnt signal and the proper open or close signal fl_sbva_oporcl from OR circuit 80 is not true, the not function being provided by an inverter circuit 87. The false state of latch 85 (Q output false) indicates that the surge bleed valve currently has a fault.

A comparison of the number of reliable valve status change signals provided by counter 73 with the number of okay operations of the surge bleed valve provided by counter 77 provides valuable information for evaluating the performance of the surge bleed valve.

It should be understood, of course, that the foregoing relates to preferred embodiments of the invention and that modifications may be made without departing from the spirit and scope of the invention as set forth in the following claims.

We claim:

1. A method of detecting surge bleed valve faults in a gas turbine engine, comprising:
   monitoring an engine operating parameter in the gas turbine engine;
   distinguishing a difference between normal engine acceleration or deceleration and surge bleed valve opening or closing;
   transmitting a valve status change signal to a surge bleed valve in the gas turbine; and
   setting a valve operation check signal to a fault indicating state if the monitored engine operating parameter does not change by at least a predetermined amount immediately following transmission of the valve status change signal to the surge bleed valve.

2. The method of claim 1, wherein the monitored engine operating parameter is the rate of rotation of a rotary member in the gas turbine engine.

3. The method of claim 1, wherein the valve status change signal is one of a valve close signal and a valve open signal.

4. The method of claim 1, further comprising determining a rate of change of the monitored engine operating parameter and wherein the valve operation check signal is set to a fault indicating state if the rate of change of the monitored engine operating parameter does not exceed a predetermined threshold immediately following transmission of the valve status change signal to the surge bleed valve.

5. The method of claim 4, wherein the monitored engine operating parameter is the rate of rotation of a rotary member in the gas turbine engine.

6. A method of detecting surge bleed valve faults in a gas turbine engine, comprising:
   monitoring an engine operating parameter in the gas turbine engine;
   transmitting a valve status change signal to a surge bleed valve in the gas turbine engine;
   setting a valve operation check signal to a fault indicating state if the monitored engine operating parameter does not change by at least a predetermined amount immediately following transmission of the valve status change signal to the surge bleed valve; and
   determining a second derivative with respect to time of the monitored engine operating parameter and wherein the valve operation check signal is set to a fault indicating state if the second derivative of the monitored engine operating parameter does not exceed a predetermined threshold immediately following transmission of the valve status change signal to the surge bleed valve.

7. The method of claim 6, wherein the monitored engine operating parameter is the rate of rotation of a rotary member in the gas turbine engine.

8. The method according to claim 6, wherein one of the engine parameters is a fan speed signal derived from a suitable fan speed transducer or sensor.

9. The method according to claim 6, wherein one of the engine parameters is a gas generator speed signal derived from a suitable gas generator speed transducer or sensor.

10. The method according to claim 6, further comprising the step of distinguishing a difference between normal engine acceleration or deceleration and the surge bleed valve opening or closing.

11. A method of detecting surge bleed valve faults in a gas turbine engine, comprising:
    monitoring an engine operating parameter in the gas turbine engine;
    transmitting a valve status change signal to a surge bleed valve in the gas turbine engine;
    setting a valve operation check signal to a fault indicating state if the monitored engine operating parameter does not change by at least a predetermined amount immediately following transmission of the valve status change signal to the surge bleed valve;
    monitoring a rate of rotation of a rotary member in the gas turbine engine; and
    producing an engine slow signal when the gas turbine engine is operating in a steady state, slow acceleration, or slow deceleration condition and wherein the valve operation check signal is set to a fault indicating state only if the engine slow signal is true and the monitored engine operating parameter does not change by at least a predetermined amount immediately following transmission of the valve status change signal to the surge bleed valve.

12. The method according to claim 11, wherein one of the engine parameters is a fan speed signal derived from a suitable fan speed transducer or sensor.

13. The method according to claim 11, wherein one of the engine parameters is a gas generator speed signal derived from a suitable gas generator speed transducer or sensor.

14. The method according to claim 11, further comprising the step of distinguishing a difference between normal engine acceleration or deceleration and the surge bleed valve opening or closing.

15. A system for detecting a surge bleed valve faults in a gas turbine engine, comprising:

a sensor for monitoring an engine operating parameter in the gas turbine engine;

a circuitry for transmitting a valve status change signal to a surge bleed valve in the gas turbine engine; and a mechanism, which distinguishes a difference between normal engine acceleration or deceleration and the surge bleed valve opening or closing, for producing a valve fault indicating signal if the monitored engine operating parameter does not change by at least a predetermined amount immediately following transmission of the valve status change signal to the surge bleed valve.

* * * * *